US005723057A

United States Patent [19]
Macaudiere

[11] Patent Number: 5,723,057
[45] Date of Patent: Mar. 3, 1998

[54] PSEUDO-AZEOTROPIC MIXTURE OF CHLORODIFLUOROMETHANE, 1,1,1-TRIFLUOROETHANE AND PENTAFLUOROETHANE, AND ITS APPLICATION AS A REFRIGERANT IN LOW-TEMPERATURE REFRIGERATION

[75] Inventor: Sylvie Macaudiere, Asnieres, France

[73] Assignee: Elf Atochem S.A., France

[21] Appl. No.: 717,749

[22] Filed: Sep. 23, 1996

Related U.S. Application Data

[63] Continuation of Ser. No. 436,692, May 8, 1995, abandoned.

[30] Foreign Application Priority Data

Feb. 17, 1995 [FR] France ................... 95 01858

[51] Int. Cl.$^6$ ................................................. C09K 5/04
[52] U.S. Cl. ............................ 252/67; 510/177; 510/410; 62/114; 62/324.1
[58] Field of Search .................. 252/67, 172, DIG. 9; 62/114, 324.1; 510/177, 410

[56] References Cited

U.S. PATENT DOCUMENTS

| 4,923,626 | 5/1990 | Tamura et al. ................. 252/67 |
| 4,943,388 | 7/1990 | Shankland et al. ............. 252/69 |
| 5,062,985 | 11/1991 | Takemasa ....................... 252/67 |
| 5,211,867 | 5/1993 | Shankland et al. ............. 252/67 |
| 5,277,834 | 1/1994 | Bivens et al. .................. 252/67 |
| 5,616,276 | 4/1997 | Bivens et al. .................. 252/67 |

FOREIGN PATENT DOCUMENTS

| 430131 | 6/1991 | European Pat. Off. . |
| 448997 | 10/1991 | European Pat. Off. . |
| 638623 | 2/1995 | European Pat. Off. . |
| 92/01762 | 2/1992 | WIPO . |
| 93/07231 | 4/1993 | WIPO ........................... 252/67 |

OTHER PUBLICATIONS

The Random House College Dictionary, Revised Edition, Jess Stein editor in chief, p. 1067, 1982 (Month not known).

*Primary Examiner*—Douglas J. McGinty
*Attorney, Agent, or Firm*—Bell, Boyd & Lloyd

[57] ABSTRACT

To replace the azeotropic mixture of chlorodifluoromethane and chloropentafluoroethane (R-502) in low-temperature refrigeration, the invention proposes to use a pseudo-azeotropic mixture containing 45 to 50% by weight of chlorodifluoromethane, 44 to 48% by weight of 1,1,1-trifluoroethane, and 6 to 8% by weight of pentafluoroethane. The thermodynamic properties of this mixture are very similar to those of mixture R-502.

4 Claims, No Drawings

PSEUDO-AZEOTROPIC MIXTURE OF CHLORODIFLUOROMETHANE, 1,1,1-TRIFLUOROETHANE AND PENTAFLUOROETHANE, AND ITS APPLICATION AS A REFRIGERANT IN LOW-TEMPERATURE REFRIGERATION

This is a continuation of application Ser. No. 08/436,692, filed on May 8, 1995, now abandoned.

FIELD OF THE INVENTION

The invention relates to the field of refrigeration, and its particular object is a pseudo-azeotropic mixture of low boiling point compounds, having little or no action on the environment, and usable as refrigerant in low-temperature refrigeration systems.

BACKGROUND OF THE INVENTION

In these systems employed in commercial or industrial refrigeration, operations are based on a thermodynamic cycle generally defined by an evaporating temperature lying between −35° and −45° C. (usually −40° C.), a condensing temperature lying between +30° and +55° C., and a vapor superheat of at least 10° C.

The refrigerant routinely used in low-temperature refrigeration is the azeotropic mixture (called R-502) of chlorodifluoromethane and chloropentafluoroethane. In fact, due to its high action factor on ozone, R-502 must be replaced by refrigerants containing no chlorofluorocarbons (CFC) such as chloropentafluoroethane (CFC 115).

To replace R-502 in existing low-temperature refrigeration installations, the substitute must exhibit thermodynamic properties, particularly operating pressures, a coefficient of performance (COP) and a refrigerating capacity, which are as similar as possible to those of R-502. Furthermore, the substitute must be non-flammable and must remain so in the case of leakage in the vapor phase, even in the most unfavorable case (leak at low temperature).

It has already been proposed to replace R-502 by pseudo-azeotropic mixtures of pentafluoroethane (HFC 125), 1,1,1-trifluoroethane (HFC 143a) and chlorodifluoromethane (HCFC 22). Thus U.S. Pat. No. 4,943,388 recommends the use of mixtures consisting of 13 to 86% by weight of HFC 125, 7 to 57% by weight of HFC 143a, and 7 to 80% by weight of HCFC 22, and described in particular (Example 3) a mixture containing 14% of HFC 125, 52% of HFC 143a, and 34% of HCFC 22. Patent Application WO 92/01762 proposed the use of mixtures consisting of 5 to 30% by weight of HFC 125, 30 to 60% of HFC 143a, and 30 to 55% of HCFC 22, and described in particular (Example 2) a mixture containing 20% of HFC 125, 35% of HFC 143a, and 45% of HCFC 22. This mixture and the one described in the aforementioned US patent exhibit thermodynamic properties (COP and capacity) very similar to those of R-502.

DESCRIPTION OF THE INVENTION

It has now been found that the properties of R-502 can be approached even closer by using a mixture containing 45 to 50% by weight of HCFC 22, 44 to 48% by weight of HFC 143a, and 6 to 8% by weight of HFC 125. The mixture according to the invention has an action factor on ozone which is nearly zero, and a weaker greenhouse effect than that of R-502. It also displays pseudo-azeotropic behavior, thus minimizing problems of distillation in the system and of maintenance. The mixture according to the invention is also non-flammable at ambient or elevated temperature (100° C.) and remains so even in the case of leakage at low temperature (−40° C.).

EXAMPLES

The following examples illustrate the invention without implied limitation.

EXAMPLE 1

This example shows that the mixture HCFC 22/HFC 125/HFC 143a according to the invention only undergoes very little distillation in the case of a leak of the vapor phase.

The temperature was kept constant at 25° C. The container was initially filled with a mixture containing 47% HCFC 22, 7% HFC 125, and 46% HFC 143a (hereinafter called composition $C_1$).

The vapor phase leakage was continued until more than 80% of the initial charge was dissipated. During the experiment, samples of the gas phase were collected and analyzed by standard means of gas chromatography. The results are given in Table 1 below.

TABLE 1

| drainage rate | composition (weight %) | | |
|---|---|---|---|
| (%) | HCFC 22 | HFC 125 | HFC 143a |
| 0 | 43.25 | 8.23 | 48.52 |
| 6 | 44.50 | 7.75 | 47.76 |
| 12 | 44.04 | 7.92 | 48.04 |
| 30 | 45.66 | 7.40 | 46.94 |
| 45 | 45.77 | 7.30 | 46.94 |
| 64 | 49.03 | 6.36 | 44.61 |
| 79 | 48.93 | 6.38 | 44.69 |
| 92 | 48.76 | 6.35 | 44.88 |

By operating in the same way, but at −40° C., the results obtained are given in Table 2 below.

TABLE 2

| drainage rate | composition (weight %) | | |
|---|---|---|---|
| (%) | HCFC 22 | HFC 125 | HFC 143a |
| 0 | 40.54 | 8.55 | 50.91 |
| 6 | 40.77 | 8.42 | 50.82 |
| 12 | 41.23 | 8.33 | 50.44 |
| 28 | 41.97 | 8.13 | 49.90 |
| 48 | 43.11 | 7.75 | 49.13 |
| 66 | 45.44 | 7.30 | 47.26 |
| 84 | 50.29 | 6.08 | 43.64 |
| 93 | 52.16 | 5.65 | 42.20 |

These data show that a loss of nearly 80% by weight of the initial charge only slightly changes the composition of the mixture.

Furthermore, the flammability limits in air of the different binary and ternary mixtures of HCFC 22, HFC 125 and HFC 143a were determined by method ASTM E-681. With binary mixtures HCFC 22/HFC 143a and HFC 143a/HFC 125 and ternary mixtures HCFC 22/HFC 125/HFC 143a, and regardless of the respective proportions of HCFC 22 and HFC 143a, the flammability limit in air at ambient temperature of the different mixtures corresponds to a maximum HFC 143a content of 63% by weight.

Similarly, the flammability limits were determined at 100° C., and correspond respectively to maximum 143a contents of 58% for the mixture 125/143a, and of 52.5% for the mixture 22/143a.

The ternary mixture according to the invention is therefore non-flammable at ambient or elevated temperature (100° C.), and remains so even in the case of a vapor leak, because, as shown in Tables 1 and 2, the maximum content of HFC 143a observed is only 50.91%.

EXAMPLE 2

This example shows that the vapor pressure of the pseudo-azeotropic mixture according to the invention is similar to that of R-502, and over a wide range of temperatures.

Table 3 summarizes the bubble-point and dew-point data for a mixture corresponding to composition $C_1$.

The very slight differences (<0.2 bar) between the bubble-point and dew-point pressures show that the mixture can be considered as pseudo-azeotropic.

TABLE 3

| temperature (°C.) | absolute pressure (bar) | | |
|---|---|---|---|
| | composition $C_1$ | | |
| | bubble-point | dew-point | R-502 |
| −40 | 1.24 | 1.20 | 1.296 |
| −20 | 2.81 | 2.75 | 2.910 |
| 0 | 5.60 | 5.52 | 5.731 |
| 20 | 10.13 | 10.02 | 10.20 |
| 40 | 16.98 | 16.84 | 16.77 |
| 60 | 26.82 | 26.66 | 26.01 |

EXAMPLE 3

The thermodynamic performance of composition $C_1$ according to the invention was compared with that of R-502 and of the mixtures described in Example 2 of document WO92/01762 (composition $C_2$) and in Example 3 of document U.S. Pat. No. 4,943,388 (composition $C_3$), for a standard thermodynamic cycle defined as follows:

| condensing temperature | +55° C. |
|---|---|
| evaporating temperature | −40° C. |
| temperature at compressor inlet | +18° C. |

The results are given in Table 4.

TABLE 4

| composition | condensation pressure (bar) | COP* | capacity* | liquid throughput* |
|---|---|---|---|---|
| R-502 | 23.4 | | | |
| $C_1$ | 23.9 | 1.007 | 1.01 | 0.73 |
| $C_2$ | 24.7 | 0.993 | 1.03 | 0.78 |
| $C_3$ | 24.7 | 0.979 | 1.01 | 0.78 |

*Values with respect to R-502.

Composition $C_1$ serves to obtain the same thermodynamic performance (COP and capacity) as that of R-502 in an existing installation, without requiring changes in the operating pressures. Furthermore, composition $C_1$ helps to reduce the effective charge of refrigerant by about 27% by weight.

I claim:

1. An azeotrope-like mixture consisting of, by weight, 45% to 50% chlorodifluoromethane, 44% to 48% 1,1,1-trifluoroethane, and 6% to 8% pentafluoroethane, wherein the difference between the bubble-point and the dew point pressures of said azeotrope-like mixture is less than 0.2 bar for temperatures ranging from about −40° C. to about 60° C.

2. An azeotrope-like mixture according to claim 1, consisting of, by weight, 47% chlorodifluoromethane, 46% 1,1,1-trifluoroethane, and 7% pentafluoroethane.

3. A process of refrigeration comprising the step of evaporating the composition of claim 1.

4. A process of refrigeration comprising the step of evaporating the composition of claim 2.

* * * * *